United States Patent Office 3,294,841
Patented Dec. 27, 1966

3,294,841
COMPLEXES OF HALOGENATED
ACETONE-OXIMES
Karoly Szabo, Orinda, and Ashley H. Freiberg, Santa Clara, Calif., assignors to Stauffer Chemical Company, New York, N.Y., a corporation of Delaware
No Drawing. Filed May 20, 1965, Ser. No. 457,506
6 Claims. (Cl. 260—566)

This invention relates to certain new and novel organic compounds which may be used to control microorganisms, such as fungi and the like. More particularly, this invention pertains to complex addition products of fluorinated ketones and certain substituted oximes as represented by the following formula:

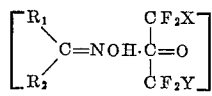

wherein X and Y are selected from the group consisting of chlorine and fluorine, $R_1$ is selected from the group consisting of hydrogen, lower alkyl containing from 1 to 6 carbon atoms, inclusive, and phenyl, and $R_2$ is selected from the group consisting of lower alkyl containing from 1 to 6 carbon atoms, inclusive, phenyl, furyl and lower N-hydroxyalkanoimido groups, and $R_1$ and $R_2$ jointly are a divalent alkylene radical containing 4 to 6 carbon atoms.

It has been found that the new and novel compounds of the present invention are particularly effective as fungicides. They are effective as preventative and eradicative fungicides and also exhibit systemic activity in controlling fungicidal diseases.

These compounds can be conveniently prepared by bringing the reactants, i.e., the appropriate fluorine-containing ketone and selected oxime into contact with one another. Initially the oxime can be prepared by the condensation of various aldehydes and ketones with hydroxylamine. These condensation derivatives are known as aldoximes or ketoximes depending upon the nature of the carbonyl component. Therefore, by oxime we mean herein both the condensation products obtained from an aldehyde or a ketone and hydroxylamine. One method of forming the complex-addition product of said oximes is by contacting the reactants in the presence of a normally liquid inert organic solvent, such as benzene and its homologs, chlorinated hydrocarbons, ketones and the like. The reaction is carried out at moderate temperatures. Generally, the components tend to combine exothermically with a slight amount of heat given off. The reaction temperature can be readily controlled by applying a cooling bath or the like to withdraw the surplus heat given off. When adequate care is exercised the products can be obtained in very high yields and technical purity.

The exact nature of the fluorine-containing acetone-oxime adducts of the present invention have not as yet been fully determined. The evidence gathered thus far indicates them to be a type of addition product, since their formation is not accompanied by the elimination or formation of any detectable by-products. The adducts show a definite stoichiometry evidenced by the ratio of 1 mole of fluorine containing ketone per molar equivalent of hydroximino group (=NOH) present in the oxime. This is exemplified by the composition of the dimethylglyoxime-sym-dichlorotetrafluoroacetone complex which contains two equivalents of the chlorofluoro acetone per mole of dimethylglyoxime. In lieu of more substantial evidence as to the exact nature of the compounds any further discussion along theoretical lines of possible structures will be foregone. It should be pointed out, however, that the compositions of the present invention are not promiscuous, but instead are discrete chemical entities.

A method of preparing representative compounds of the present invention, as well as the manner of using them in fungicidal compositions, is illustrated in the following examples.

EXAMPLE 1

Acetoxime (7.3 g., 0.1 M) was suspended in 40 ml. of methylene chloride and 20 g. of sym-dichlorotetrafluoroacetone was added portionwise thereto. The addition of each portion resulted in heat evolution. The oxime gradually went into solution. When the addition was complete the mixture was stirred for an hour, allowed to cool to ambient temperature and stripped of volatile components. There was obtained 26.5 g. of a yellow liquid corresponding to the adduct (acetoxime·sym-dichlorotetrafluoroacetone), $n_D^{25}=1.4055$.

EXAMPLE 2

Benzaldoxime (12.1 g., 0.1 M) was dissolved in 50 ml. of methylene chloride. Hexafluoroacetone was introduced into the solution by means of an inlet tube. An exothermic reaction took place. When 0.1 M (16.1 g.) of hexafluoroacetone had been taken up the addition was stopped. The mixture was stripped of volatiles and there was obtained 27.1 g. of a yellow liquid (benzaldoxime·hexafluoroacetone) adduct, $n_D^{25}=1.4530$.

The following is a table of representative compounds prepared according to the aforedescribed procedure. Compound numbers have been assigned to each compound and are used throughout the balance of the application.

Table I

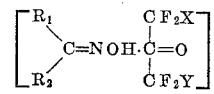

| Compound Number | X | Y | $R_1$ | $R_2$ | M.P. or $n_D^{25}$ |
|---|---|---|---|---|---|
| 1 | Cl | Cl | Pentamethylene | | 1.4531 |
| 2 [1] | Cl | Cl | Methyl | N-hydroxy-acetimido. | 60° |
| 3 | Cl | Cl | Ethyl | Methyl | 1.4037 |
| 4 [2] | Cl | Cl | Methyl | Methyl | 1.4055 |
| 5 | Cl | Cl | Phenyl | Phenyl | 1.5114 |
| 6 | Cl | Cl | Hydrogen | Furyl | 1.5082 |
| 7 | Cl | Cl | do | Phenyl | 1.5150 |
| 8 | F | Cl | do | do | 1.4778 |
| 9 [3] | F | F | do | do | 1.4530 |

[1] No. 2 has a 2:1 ratio of fluorochloroacetone to dioxime.
[2] No. 4 prepared in the Example 1.
[3] No. 9 prepared in the Example 2.

The compositions of the present invention were tested as fungicides as described in the following tests.

*Foliage fungicide test.*—This test indicates protectant action as well as eradicant and leaf systemic action against fungi attacking plant foliage. Exactly which action is operating is determined by evaluation tests. Pinto bean plants are sprayed with dissolved or suspended chemical in water at a concentration of 1000 parts per million. The active compound is preferably dissolved in water, and for this purpose it is recommended that a surface active agent or wetting agent be employed to facilitate formulation of the dispersions. After the sprayed plants are dried they are inoculated with bean rust spores. Development of the rust infection requires overnight treatment in a mist chamber following inoculation. Results are read when disease symptoms are distinct on untreated bean plants. The results are recorded as 100 which signifies no pustule formation; ++++ which indicates 75–100% control; +++ 50–75% control; ++ 25–50% control; + 5–25% control, and 0 no visible control.

*Foliage weathering test.*—To be of promise in commercial applications a compound must be capable of remaining on sprayed plants for a given length of time under various weathering conditions. Chemicals that are immediately hydrolyzed, volatilized, or otherwise inactivated make poor protectant fungicides. Although formulation and additives may aid the weathering ability of a compound, there must be some inherent weathering capacity present. The simulated weathering test tends to be more gentle than actual conditions; however, after two days and two nights in the moist chamber, definite results will be evident. The treated and weathered pinto bean plants were inoculated with bean rust and thus allowed to develop disease symptoms. Data was gathered as in the screening test.

*Eradicant foliage fungicide test.*—Compounds that eliminate visible fungus infection are often preferred by users who do not want to apply compounds for what might be needless protection at considerable expense. Although an eradicant that protects against infection after fungus eradication is the most desirable, it is not always necessary. Candidate compounds were tested at 1000, 500 and 100 p.p.m. on established bean rust. The results were noted and recorded as in the foliage fungicide test above.

The results of the aforementioned tests are given in Table II.

*Systemic foliage fungicide test.*—This test measures the fungicidal activity of compounds that move systemically, i.e., root absorption and upward translocation, in a plant after introduction through the roots. In carrying out these tests, 60 ml. of solution containing the candidate systemic compound diluted to 50 parts per million in distilled water was placed into each of two test tubes. A pinto bean plant was placed in each tube, using a cotton plug to support the seedling and to prevent evaporation of the water. After 48 hours the two plants were inoculated with rust. Compounds exhibiting 100% control at this 50 p.p.m. concentration were evaluation at lower concentrations. Table III contains the results of the systemic fungicide tests giving 100% control.

*Soil drench evaluation test.*—Other than mixing or injecting a compound into the soil, the candidate can be applied as a water drench. The soil drench evaluation test is carried out by mixing a compound into the soil after application in the form of a water drench. In this test the concentrations were diluted to the lowest value that will demonstrate fungicidal activity. Pinto beans with rust infection were used. The concentrations are reported in Table III under Soil Drench-Rust.

Table III

| Compound Number | Systemic Fungicide Test (parts per million) Rust | Soil Drench (parts per million) Rust |
|---|---|---|
| 1 | 5 | |
| 2 | 5 | 0.75 |
| 3 | 5 | 3 |
| 4 | 5 | 1.5 |
| 5 | 5 | 27 |
| 6 | 5 | 3 |
| 7 | 5 | 0.75 |
| 8 | [1] 0.5 | 0.37 |
| 9 | 1 | 0.37 |

[1] 90% control at this concentration.

The compounds of the present invention may be used as effective topical, as well as systemic, fungicides and may be applied in a variety of ways at various concentrations. In practice the compounds are usually formulated with an inert fungicidal adjuvant, utilizing methods well-known to those skilled in the art, thereby making them suitable for application as dusts, sprays, drenches and the like. The amount applied will depend upon the nature of the particular utility desired. The rate of application may also vary with the microbiological use intended. If conditions exist that are extremely favorable to attack of the plant by fungus, it may be necessary to repeat the fungicide application at very short intervals to prevent infection or to check infection after it has occurred. One particularly advantageous way of applying the fungicidal composition comprising the adjuvant and an effective amount of a compound of the present invention is in a liquid diluted spray wherein all parts of the plant are wet to the point of run-off.

Various changes and modifications may be made without departing from the spirit and scope of the invention described herein as will be apparent to those skilled in the art to which it pertains. It is accordingly intended that the present invention shall only be limited by the scope of the appended claims.

We claim:

1. A compound having the formula

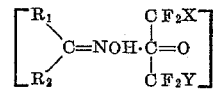

wherein X and Y are selected from the group consisting of chlorine and fluorine, $R_1$ is selected from the group

Table II

| Compound Number | Foliage Fungicide Screening Test, Percent Control Rust, 1,000 p.p.m. | Foliage Weathering Test, Percent Control Rust | | | Eradicant Test, Percent Control Rust | | |
|---|---|---|---|---|---|---|---|
| | | 1,000 p.p.m. | 500 p.p.m. | 100 p.p.m. | 1,000 p.p.m. | 500 p.p.m. | 100 p.p.m. |
| 1 | 100 | 100 | 100 | 100 | 100 | 100 | ++++ |
| 2 | 100 | 100 | 100 | 100 | ++++ | +++ | ++ |
| 3 | 100 | 100 | 100 | ++++ | ++++ | ++++ | +++ |
| 4 | 100 | 100 | 100 | ++++ | 100 | 100 | ++++ |
| 5 | 100 | 0 | 0 | 0 | 100 | 100 | ++++ |
| 6 | ++++ | 100 | 100 | 100 | ++++ | ++++ | 0 |
| 7 | 100 | 100 | 100 | ++++ | ++++ | ++++ | +++ |
| 8 | 100 | | | | 100 | 100 | 100 |
| 9 | 100 | | | | 100 | 100 | ++ | consisting of hydrogen, lower alkyl and phenyl, and $R_2$ is selected from the group consisting of lower alkyl, phenyl, furyl and lower N-hydroxyalkanoimido groups, and $R_1$ and $R_2$ jointly are a divalent alkylene radical containing 4 to 6 carbon atoms.

2. Cyclohexanoneoxime - sym - dichlorotetrafluoroacetone complex.

3. 2-butanoneoxime - sym - dichlorotetrafluoroacetone complex.

4. Benzophenoneoxime - sym - dichlorotetrafluoroacetone complex.

5. Benzaldoxime-monochloropentafluoroacetone complex.

6. Benzaldoxime-hexafluoroacetone complex.

References Cited by the Examiner

UNITED STATES PATENTS

| | | | |
|---|---|---|---|
| 2,638,482 | 5/1953 | Grundmann | 260—566 |
| 2,770,652 | 11/1956 | England | 260—566 |
| 2,818,367 | 12/1957 | Jaworski | 167—30 |
| 2,963,399 | 12/1960 | Bluestone | 167—30 |
| 2,971,028 | 2/1961 | Gray | 260—566 |

OTHER REFERENCES

Bell et al.: "Proc. Royal Society of London," vol. A261, pages 38 to 42 (1961).

CHARLES B. PARKER, *Primary Examiner.*

ROBERT V. HINES, STANLEY J. FRIEDMAN,
*Assistant Examiners.*